United States Patent
Jakobs et al.

(10) Patent No.: US 8,515,602 B2
(45) Date of Patent: Aug. 20, 2013

(54) METHOD AND DEVICE FOR CHECKING THE FUNCTION OF AN ENGINE SYSTEM

(75) Inventors: Kai Jakobs, Kornwestheim (DE); Felix Reber, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 13/065,514

(22) Filed: Mar. 22, 2011

(65) Prior Publication Data
US 2011/0238253 A1    Sep. 29, 2011

(30) Foreign Application Priority Data
Mar. 24, 2010   (DE) .......................... 10 2010 003 199

(51) Int. Cl.
*G01M 15/04*   (2006.01)

(52) U.S. Cl.
USPC .......................................................... 701/20

(58) Field of Classification Search
USPC .......................................... 701/29, 104, 114
See application file for complete search history.

(56) References Cited

U.S. PATENT DOCUMENTS

| | | | |
|---|---|---|---|
| 6,039,032 A * | 3/2000 | Morikawa et al. | 123/520 |
| 6,321,735 B2 * | 11/2001 | Grieve et al. | 123/674 |
| 6,606,976 B2 * | 8/2003 | Nagano et al. | 123/431 |
| 6,679,205 B2 * | 1/2004 | Morikami | 123/90.15 |
| 7,013,871 B2 * | 3/2006 | Zhu et al. | 123/406.21 |
| 7,461,632 B2 * | 12/2008 | Raimann et al. | 123/431 |
| 2005/0178360 A1 * | 8/2005 | Satou | 123/431 |
| 2005/0257771 A1 * | 11/2005 | Nakayama et al. | 123/431 |
| 2007/0199553 A1 * | 8/2007 | Thiel et al. | 123/690 |
| 2010/0036580 A1 * | 2/2010 | Hartmann et al. | 701/102 |

\* cited by examiner

*Primary Examiner* — Thomas Tarcza
*Assistant Examiner* — Alex C Dunn
(74) *Attorney, Agent, or Firm* — Kenyon & Kenyon LLP

(57) ABSTRACT

A method for checking the function of an engine system having an internal combustion engine includes: (a) ascertaining a first charge adaptation value for acting on a manipulated variable for setting an air supply to the internal combustion engine, and ascertaining a first mixture adaptation value for acting on a manipulated variable for setting a fuel supply at a predefined first operating point of the internal combustion engine, in each case with the aid of a predefined adaptation method; and (b) establishing that an error is present in the engine system when at least one of the offset adaptation values is outside a particular predefined adaptation value range.

10 Claims, 2 Drawing Sheets

METHOD AND DEVICE FOR CHECKING THE FUNCTION OF AN ENGINE SYSTEM

BACKGROUND OF THE INVENTION

1. Field of the Invention

The present invention relates to a method of checking the function of an engine system having an internal combustion engine, e.g., checking of the function of an engine system installed in a motor vehicle after completion of the motor vehicle or after a repair, and particularly relates to the recognition of a malfunction based on adaptation values for a mixture adaptation or for a charge adaptation.

2. Description of the Related Art

Internal combustion engines are generally operated with the aid of a control unit. The control unit detects operating states of the internal combustion engine as well as environmental conditions, and receives an instruction from the driver, in particular in the form of a driver's intended torque. As a function of the provided variables, position sensors of the internal combustion engine, for example a position sensor for a throttle valve, a position sensor for fuel injectors, and other position sensors as well as the spark plugs for generating an ignition spark are controlled in order to operate the internal combustion engine in the intended manner.

The position of a position sensor intended by the control unit may differ from the actual position of the position sensor due to component tolerances and aging effects. In particular, with the aid of adaptation it is possible for control units to learn a deviation of the charge and of the mixture composition. Adaptation is used to modify the control variable which is output to the applicable position sensor and which causes displacement of the position sensor in such a way that the position of the position sensor intended by the provided control variable corresponds as closely as possible to the actual position of the position sensor, or that the effect of the position sensor intended by the provided control variable corresponds as closely as possible to the actual effect of the position sensor in the overall system.

The adaptation is carried out in that control variables provided by the control unit are acted on by adaptation values. The adaptation values include, for example, an offset adaptation value which acts on the control variable in an additive manner, and a slope adaptation value which acts on the control variable in a multiplicative manner.

In principle, the adaptation values are learned in multiple learning ranges. The learning ranges concern operating ranges of the internal combustion engine, which may be defined, for example, by an engine load at a rotational speed. In many cases, the additive offset adaptation value is learned in the idle operating range and the multiplicative slope adaptation value is learned in a partial load operating range. In driving mode of the motor vehicle, the adaptation values are appropriately adapted when the motor vehicle is operated in these operating ranges.

Based on the adaptation values thus obtained, various diagnostic functions are carried out via which errors in the engine system may be recognized and communicated to the driver. The error may also be stored in an error memory so that the error memory may be read out in a repair shop.

During manufacture of the motor vehicle, at the end of the assembly line it is desirable to have the most rapid option possible for testing the manufactured motor vehicles for mixture or charge errors, i.e., to identify errors which may result in operation of the internal combustion engine which differs from an intended operation due to a malfunction of the throttle valve position sensor, the injector position sensor, and the like. Heretofore, at the end of the manufacturing assembly line for a motor vehicle the engine system is operated in an idle operating state in which an adaptation was carried out in order to learn the additive offset adaptation values for the mixture adaptation and the charge adaptation. For an additive offset adaptation value which is not equal to zero, this generally results in incorrect metering of the quantity of fuel injected by the injectors.

The engine system of the motor vehicle is then operated at a partial load operating point with the aid of a roller type test stand, and a new adaptation is carried out in order to learn a multiplicative slope adaptation value for the injection quantity. However, to correctly carry out the adaptation and to obtain a reliable value for the multiplicative control error, on the one hand the partial load operating point must be maintained long enough for the engine system to be able to reach a steady state at the operating point, and on the other hand the operating point must be run through multiple times so that a realistic adaptation value may be ascertained.

For this purpose, it is proposed in published German patent application document DE 10 2006 007 698 A1 that the adaptation method runs through two operating points multiple times in alternation in order to increase the accuracy of the adaptation. Effects which are more likely to result in an offset error are better separated from effects which result in a slope error. After the operating points are occupied multiple times, the correct additive offset adaptation values and the correct multiplicative slope adaptation values may be ascertained, so that the component tolerances of the components causing the deviation and the changes in components due to aging may be adapted.

Since each of the partial load operating points must be occupied for a specified period of time, for example for 30 seconds up to several minutes, before the adaptation is carried out, due to the multiple changes between the partial load operating points the above-described method requires a relatively long adaptation time before correct adaptation values are obtained which are suitable for establishing whether or not the motor vehicle is free of errors.

An object of the present invention, therefore, is to be able to identify as rapidly as possible, after the motor vehicle is completed or after a repair in the repair shop, whether or not the motor vehicle is free of errors.

BRIEF SUMMARY OF THE INVENTION

According to a first aspect of the present invention, a method is provided for checking the function of an engine system having an internal combustion engine. The method includes the following steps:

ascertaining a first charge adaptation value for acting on a manipulated variable for setting an air supply to the internal combustion engine, and ascertaining a first mixture adaptation value for acting on a manipulated variable for setting a fuel supply, at a predefined first operating point of the internal combustion engine, in each case with the aid of a predefined adaptation method; and establishing that an error is present in the engine system when at least one of the offset adaptation values is outside a particular predefined adaptation value range.

One approach of the present invention is to carry out a method for checking the engine system of the motor vehicle at an operating point for which an adaptation value for a charge adaptation as well as an adaptation value for a mixture adaptation is ascertainable. In particular, the operating point may be selected in such a way that offset adaptation values are ascertained for a charge adaptation and for a mixture adaptation. Based on these adaptation values, it is possible to recognize mixture errors as well as charge errors in the internal combustion engine which have an effect on the particular first adaptation values.

In particular, the first charge adaptation value and the first mixture adaptation value may be ascertained at only an exactly predefined first operating point of the internal combustion engine.

The first operating point may correspond to an idle mode at a predefined idle speed, so that the first operating point is suitable for ascertaining the first charge adaptation value as well as the first mixture adaptation value.

If it is established that an error is present in the engine system, a second charge adaptation value for acting on a manipulated variable for setting an air supply to the internal combustion engine may be ascertained at a second operating point of the internal combustion engine with the aid of a predefined adaptation method, an error type being determined based on the first charge adaptation value and the second charge adaptation value.

According to the above method, it is proposed that for shortening the check of the functionality of the engine system in the motor vehicle, a satisfactory/unsatisfactory recognition is initially carried out by a check at the first operating point. The test is terminated as soon as it is recognized that the motor vehicle is free of errors, based on the first adaptation values thus ascertained. If an error is recognized, according to the previously known methods the check may be carried out by ascertaining the adaptation values, in particular a second charge adaptation value, at the second operating point. This allows the error which has occurred to be located more accurately.

In an example implementation of the method, the second charge adaptation value may correspond to a slope adaptation value for a charge adaptation which acts in a multiplicative manner on the manipulated variable for setting the air supply to the internal combustion engine.

In addition, the second operating point may correspond to a partial load operation at a drive torque in a normal load range, and to a rotational speed in an increased rotational speed range.

If it is established that an error is present in the engine system, a second mixture adaptation value for acting on a manipulated variable for setting a fuel supply may be ascertained at a third operating point of the internal combustion engine with the aid of a predefined adaptation method, an error type being determined based on the first mixture adaptation value and the second mixture adaptation value.

According to one specific embodiment, the second mixture adaptation value may correspond to a slope adaptation value for a mixture adaptation which acts in a multiplicative manner on the manipulated variable for setting the fuel supply.

Furthermore, the third operating point may correspond to a partial load operation at a drive torque in an increased load range at a predefined idle speed.

According to another aspect of the present invention, a device is provided for checking the function of an engine system having an internal combustion engine. The device may be designed
  to ascertain a first charge adaptation value for acting on a manipulated variable for setting an air supply to the internal combustion engine, and to ascertain a first mixture adaptation value for acting on a manipulated variable for setting a fuel supply, at a first operating point of the internal combustion engine, in each case with the aid of a predefined adaptation method; and
  to establish that an error is present in the engine system when at least one of the offset adaptation values is outside a particular predefined adaptation value range.

According to another aspect, an engine system having an internal combustion engine and having the above device is provided.

According to another aspect, a computer program product is provided which contains a program code that carries out the above method when it is executed on a data processing unit.

DETAILED DESCRIPTION OF THE INVENTION

Figure 1:
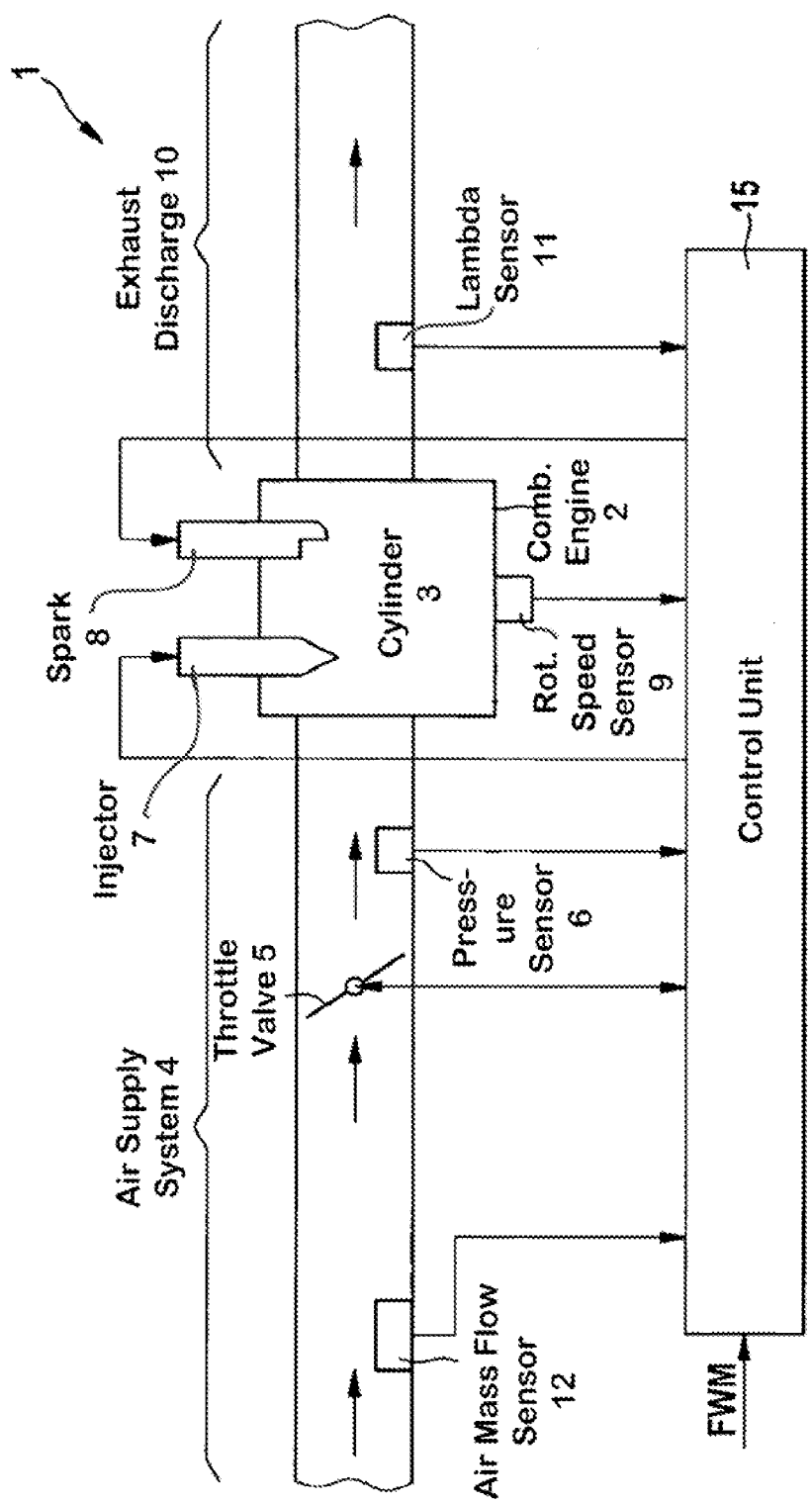
FIG. 1 shows a schematic illustration of an internal combustion engine for an engine system of a motor vehicle.

FIG. 1 schematically illustrates an engine system 1 for a motor vehicle. Engine system 1 includes an internal combustion engine 2, which in the present specific embodiment corresponds to a gasoline engine. Internal combustion engine 2 includes one or multiple cylinders 3, only one cylinder 3 being illustrated for the sake of clarity.

Cylinders 3 are supplied via an air supply system 4 with fresh air, whose direction of flow is illustrated by arrows. Situated in air supply system 4 is a throttle valve 5, the position of which may be changed in order to adjust the air mass flow into cylinders 3 of internal combustion engine 2. Throttle valve 5 is coupled to a throttle valve position sensor, via which the position of throttle valve 5 is changeable. The throttle valve position sensor may be provided with a position feedback system in order to read back the actual position of throttle valve 5.

An air mass flow sensor 12, for example in the form of a hot film air mass meter, is provided upstream from throttle valve 5. Air mass flow sensor 12 measures the instantaneous air mass flow into cylinders 3 and provides a corresponding air mass measuring signal. In addition, a pressure sensor 6 may be provided in air supply system 4, for example upstream or downstream from throttle valve 5, in the present case in a section of the intake manifold between throttle valve 5 and cylinders 3. In the exemplary embodiment shown, pressure sensor 6 measures the instantaneous intake manifold pressure and provides a corresponding intake manifold pressure measuring signal.

Cylinders 3 are each provided with an injector 7 for injecting fuel directly into cylinders 3. Alternatively, the fuel may also be injected into air supply system 4 in the section of the intake manifold between throttle valve 5 and cylinders 3. Injectors 7 are activated as a function of an injector control signal in order to set injection times and thus provide an intended quantity of injected fuel.

In addition, cylinders 3 are each provided with a spark plug 8 which may be activated by a spark plug control signal, so that an ignition of an air-fuel mixture in cylinders 3 occurs at a predefined point in time.

Internal combustion engine 2 is also coupled to a rotational speed sensor 9 which provides a rotational speed measuring signal which indicates the rotational speed of internal combustion engine 2.

The exhaust gas resulting from the combustion in the combustion chambers of cylinders 3 is discharged via an exhaust gas discharge section 10. A lambda sensor 11 may be situated in exhaust gas discharge section 10 which provides a corresponding lambda measuring signal as a function of the instantaneous oxygen content of the exhaust gas flowing into exhaust gas discharge section 10.

With the aid of a control unit 15, the air mass flow measuring signal, the intake manifold pressure measuring signal, the lambda measuring signal, and the rotational speed measuring signal are processed in combination with a predefined driver's intent torque FWM, and engine system 1, i.e., the position sensors of engine system 1, is/are appropriately activated in order to operate internal combustion engine 2 in the intended manner, i.e., at an intended rotational speed and an intended drive torque. For this purpose, control unit 15 appropriately activates the throttle valve position sensor and injectors 7, among other elements. The actual air charge may differ from an air charge intended by control unit 15 due to measuring errors of air mass flow sensor 12, of a position feedback system of the throttle valve position sensor, and of a position of throttle valve 5 which differs from the intended setting.

Control unit 15 also ascertains an air-fuel ratio in the combustion chambers of cylinders 3 which is intended for the instantaneous operating state. However, the air-fuel ratio which actually results in the combustion chambers of cylinders 3 may differ from the intended air-fuel ratio. This may be caused on the one hand by an incorrectly metered charge, and on the other hand by a fuel quantity actually injected which differs from the intended fuel quantity.

In addition, when a lambda regulation is carried out the measured lambda value provided by the lambda sensor may differ from the actual value, so that a regulation difference is incorrectly computed, which may result in an incorrect determination of the air-fuel ratio in cylinders 3 necessary for the intended engine operation.

In general, the measuring errors of the individual sensors as well as the position errors of the position sensors may be additive or may cancel each other out. To compensate for such errors, which may occur, for example, due to component tolerances or aging phenomena at various components, the adaptations are carried out for one or multiple control variables. The control variables do not have to exclusively relate to the component which has caused the deviation from ideal operation.

The adaptations provide adaptation values which act on a control variable, ascertained in control unit 15, for positioning one of the position sensors, the control variable which is acted on by the corresponding adaptation value being relayed to the appropriate position sensor. For engine system 1 this applies for the throttle valve position sensors for throttle valve 5 as well as for injectors 7. The adaptation is generally carried out by ascertaining adaptation values in so-called learning operating ranges, i.e., operating ranges of the engine system which are defined by a drive torque range and an engine speed range. The learning operating ranges are predefined, and are suitable for ascertaining the corresponding adaptation values. The adaptation is generally carried out in that the control variable ascertained by control unit 15 is acted on by an additive offset adaptation value and a multiplicative slope adaptation value.

If the additive offset adaptation value is different from 0 and/or the multiplicative slope adaptation value is different from 1, an error, i.e., a component tolerance or aging tolerance, is present. As a rule, the errors which routinely occur in practice may be compensated for with the aid of these adaptation values. However, if the additive offset adaptation values or the multiplicative slope adaptation values differ too greatly from 0 or 1, respectively, this generally involves a more serious error in the engine system which requires separate testing. The location of the particular error in the engine system may be established by analyzing the individual adaptation values. However, if the ascertained adaptation values are within predefined adaptation value ranges, it may be assumed that the engine system is operating properly.

The adaptation values are generally ascertained in a checking process after completion of the motor vehicle or after a repair. The intended result of the checking process is to establish whether or not the engine system is operating properly, and, if an error is present, which component is probably responsible for the error. In order to make this determination, the offset adaptation values as well as the slope adaptation values for the throttle valve position sensor (charge adaptation) and for the injectors (mixture adaptation) must be ascertained. As a rule, a slope adaptation value for the charge adaptation is ascertained at a drive torque in a normal load range and at a rotational speed in an increased rotational speed range; a slope adaptation value for the mixture adaptation is ascertained at a drive torque in an increased load range and at a predefined idle speed; and an offset adaptation value for the charge adaptation as well as for the mixture adaptation is ascertained at a drive torque in a normal load range and at an idle speed.

A normal load range corresponds to a drive torque between 20% and 80% of the maximum drive torque at the particular rotational speed, preferably between 30% and 70% of the maximum drive torque. An increased load range corresponds to a drive torque between 40% and 100% of the maximum drive torque at the particular rotational speed, preferably between 50%, 60%, or 70% and 75%, 80%, or 90%, respectively, of the maximum drive torque. An increased rotational speed range corresponds to a rotational speed of internal combustion engine 2 which is between 50%, 60%, or 70% and 75%, 80%, or 90%, respectively, of a predefined maximum rotational speed, preferably between 60% and 80% of the predefined maximum rotational speed.

Since in the latter case the offset adaptation values may be ascertained for the charge adaptation as well as for the mixture adaptation, in this operating range reliable information may be obtained concerning whether the vehicle in question is free of errors.

Figure 2:
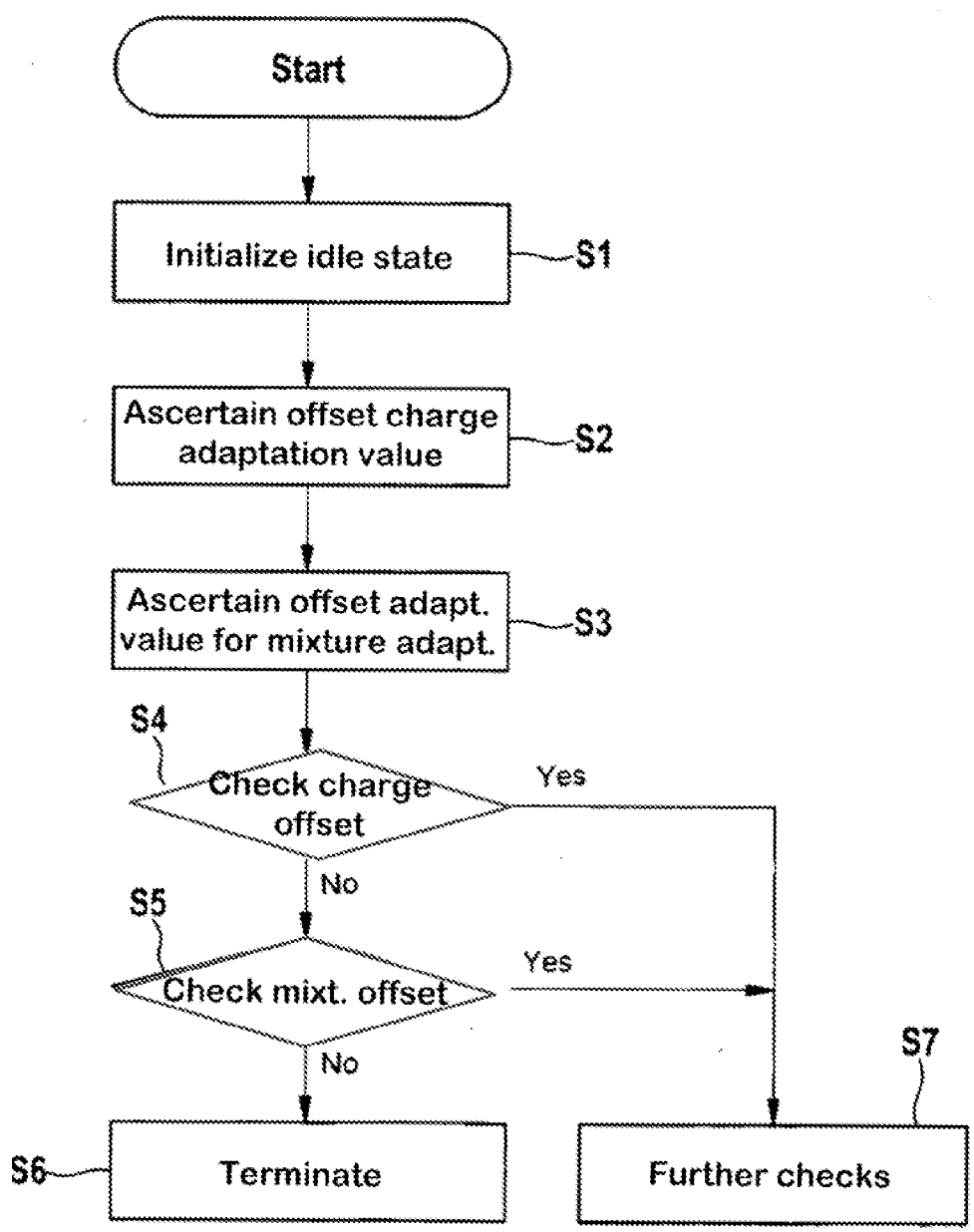
FIG. 2 shows a flow chart for illustrating the method for checking the engine system of a motor vehicle.

A method for checking the functionality of an engine system of a vehicle based on the adaptation values is explained in greater detail below with reference to the flow chart of FIG. 2.

An idle operating state is initially set in step S1 at a drive torque in the normal load range. This means that the internal combustion engine is operated by the control unit in such a way that a predefined idle speed is assumed, which may be carried out, for example, in the form of a regulation based on the rotational speed measuring signal provided by rotational speed sensor 9. It is also ensured that the internal combustion engine is operated at the predefined drive torque. The idle operating state and the predefined drive torque define an operating point within one of the learning operating ranges.

The offset adaptation value for the charge adaptation is then ascertained in step S2. The control variable for the throttle valve position sensor is acted on in an additive manner by the offset adaptation value for the charge adaptation, so that the position of throttle valve 5 associated with the adapted control variable for the throttle valve position sensor matches the actual position of throttle valve 5. In other words, the function which is used to associate an intended position of throttle valve 5 with a control variable for the throttle valve position sensor is modified with the aid of the offset adaptation value. In this way, the position of throttle valve 5 intended by the provided control variable or the intended effect in the air supply system may be occupied.

However, in idle mode this is carried out only for the offset adaptation value for the charge adaptation (charge adaptation value), and not for ascertaining the slope adaptation value. Similarly, at the same operating point an offset adaptation value for the mixture adaptation (mixture adaptation value) is ascertained in step S3, which acts on the control variables for injectors 7. The idle mode state at a drive torque in the normal load range is advantageous, since an offset adaptation value for the charge adaptation as well as the offset adaptation value for the mixture adaptation may be ascertained at this operating point. The offset adaptation value for the mixture adaptation is used to act on the control variable, i.e., the activation signal for injectors 7. The control variable for injectors 7 determines an opening and closing of injector 7, thus allowing the durations and points in time of the opening time to be established by a timed setting of the control variable. The offset adaptation value for the mixture adaptation is such that the opening duration, which determines the injected quantity of fuel, may be adapted.

With the aid of the offset adaptation values for the mixture adaptation and for the charge adaptation, errors regarding the charge setting and the mixture setting may be recognized at an operating point of internal combustion engine 2. For this purpose, a check is made in step S4 as to whether the offset adaptation value for the charge adaptation exceeds the absolute value of a certain charge adaptation threshold value. If this is the case, an error is identified (alternative: yes). If no error is identified with the aid of the charge adaptation (alternative: no), a check is made as to whether the offset adaptation value for the mixture adaptation exceeds a predetermined mixture adaptation threshold value. If this is not the case (alternative: no), it is concluded as the result of the check that the motor vehicle is operating properly, and the checking method is terminated. This may be signaled or indicated in step S6.

If it is established in one of the queries of steps S4 and S5 that the absolute value of the applicable threshold value is exceeded, a complete check of engine system 1 is carried out in step S7 based on further adaptation values. For this purpose, partial load operating points are run through which allow the slope adaptation values for the charge adaptation and for the mixture adaptation to be ascertained. A slope adaptation value for the charge adaptation may be ascertained, for example, at a rotational speed increased beyond the idle speed, while a slope adaptation value for the mixture adaptation may be ascertained at a drive torque in the increased load range at the idle speed.

With the aid of the adaptation values thus ascertained at the three different operating points, the faulty component may be deduced in a known manner. In particular, it may be provided that the partial load operating ranges are occupied in alternation in order to achieve a more reliable ascertainment of the adaptation values in question.

The above-described method may be provided, for example, in the control unit in the form of a computer program containing program code.

By using the above method, the overall time for checking the functionality of engine systems of motor vehicles at the end of the assembly line or in the repair shop may be greatly reduced, since for error-free vehicles the functionality may be recognized very quickly by checking the offset adaptation values at only one operating point according to the above method.

What is claimed is:

1. A method for checking the function of an engine system having an internal combustion engine, comprising:
    performing, at a predefined first operating point of the internal combustion engine, the following with the aid of a predefined adaptation process:
        ascertaining a first charge adaptation value which acts on an associated manipulated variable for setting an air supply to the internal combustion engine, and
        ascertaining a first mixture adaptation value which acts on an associated manipulated variable for setting a fuel supply; and
    determining that an error is present in the engine system if at least one of the first charge adaptation value and the first mixture adaptation value is outside a predefined adaptation value range;
    wherein the first charge adaptation value and the first mixture adaptation value are ascertained for the error determination at only one predefined first operating point of the internal combustion engine.

2. The method as recited in claim 1, wherein the first operating point corresponds to an idle mode at a predefined idle speed.

3. The method as recited in claim 2, further comprising performing the following at a second operating point of the internal combustion engine with the aid of the predefined adaptation process, if an error is present in the engine system:
    ascertaining a second charge adaptation value which acts on an associated manipulated variable for setting an air supply to the internal combustion engine; and
    determining an error type based on the first charge adaptation value and the second charge adaptation value.

4. The method as recited in claim 3, wherein the second charge adaptation value corresponds to a slope adaptation value for a charge adaptation which acts in a multiplicative manner on the manipulated variable for setting the air supply to the internal combustion engine.

5. The method as recited in claim 3, wherein the second operating point is defined by (i) a partial load operation at a drive torque in a normal load range, and (ii) a rotational speed in an increased rotational speed range.

6. The method as recited in claim 2, further comprising performing the following at a second operating point of the internal combustion engine with the aid of the predefined adaptation process, if an error is present in the engine system:
    ascertaining a second mixture adaptation value which acts on the manipulated variable for setting a fuel supply; and
    determining an error type based on the first mixture adaptation value and the second mixture adaptation value.

7. The method as recited in claim 6, wherein the second mixture adaptation value corresponds to a slope adaptation value for a mixture adaptation which acts in a multiplicative manner on the manipulated variable for setting the fuel supply.

8. The method as recited in claim 6, wherein the second operating point corresponds to a partial load operation at a drive torque in an increased load range at a predefined idle speed.

9. A device for checking the function of an engine system having an internal combustion engine, the device comprising:
    means for performing, at a predefined first operating point of the internal combustion engine, the following with the aid of a predefined adaptation process:
        ascertaining a first charge adaptation value which acts on an associated manipulated variable for setting an air supply to the internal combustion engine, and
        ascertaining a first mixture adaptation value which acts on an associated manipulated variable for setting a fuel supply; and
    means for determining that an error is present in the engine system if at least one of the first charge adaptation value and the first mixture adaptation value is outside a predefined adaptation value range;

wherein the first charge adaptation value and the first mixture adaptation value are ascertained for the error determination at only one predefined first operating point of the internal combustion engine.

10. A non-transitory computer-readable storage medium storing a computer program having program codes which, when executed on a computer, performs a method for checking the function of an engine system having an internal combustion engine, the method comprising:
   performing, at a predefined first operating point of the internal combustion engine, the following with the aid of a predefined adaptation process:
   ascertaining a first charge adaptation value which acts on an associated manipulated variable for setting an air supply to the internal combustion engine, and
   ascertaining a first mixture adaptation value which acts on an associated manipulated variable for setting a fuel supply; and
   determining that an error is present in the engine system if at least one of the first charge adaptation value and the first mixture adaptation value is outside a predefined adaptation value range;
   wherein the first charge adaptation value and the first mixture adaptation value are ascertained for the error determination at only one predefined first operating point of the internal combustion engine.

* * * * *